(No Model.)  2 Sheets—Sheet 1.
H. CARMONT.
STARTER OR BRAKE FOR VEHICLES.
No. 514,812. Patented Feb. 13, 1894.
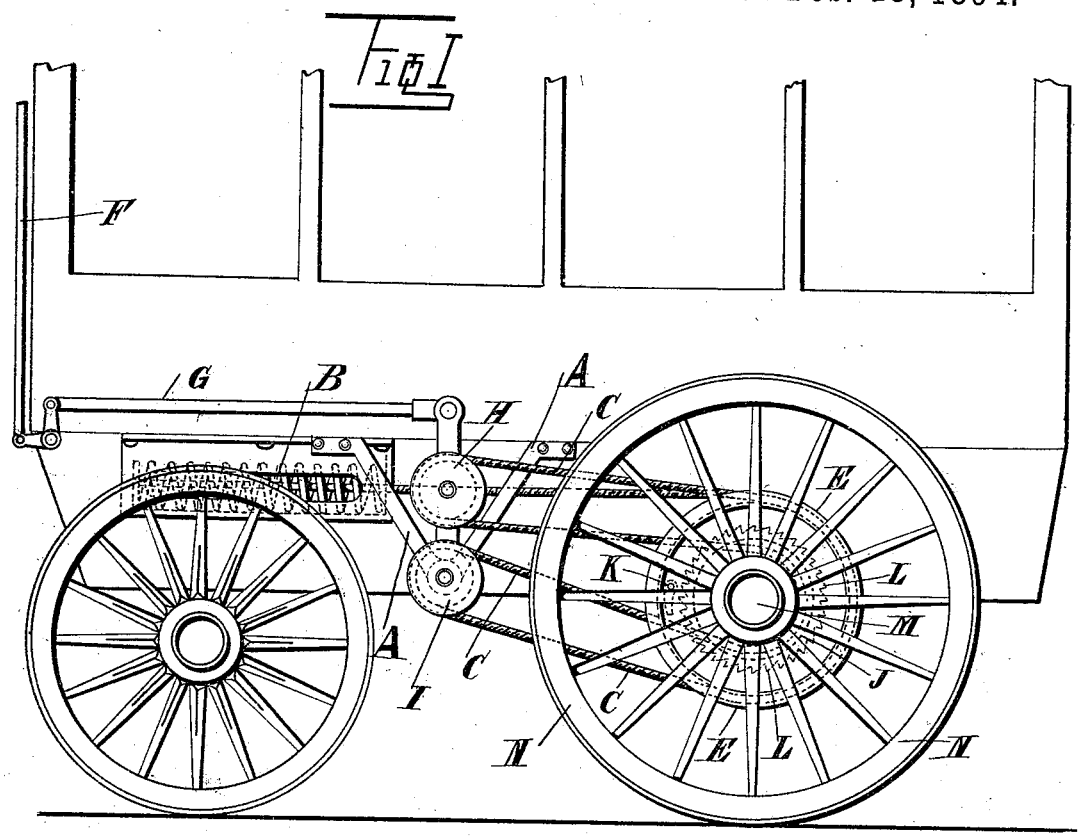
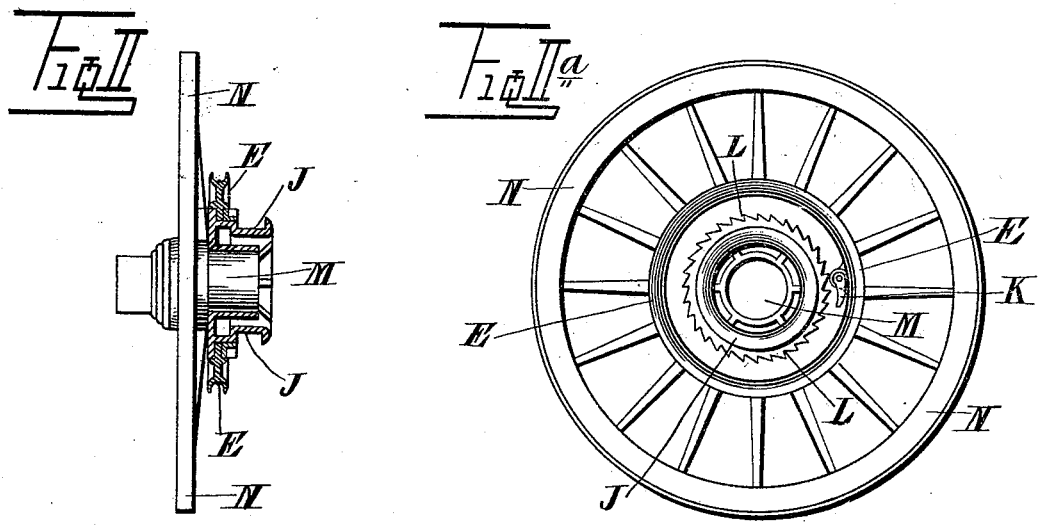
Witnesses:
G. W. Rea,
J. G. Meyer Jr.
Inventor:
Harriett Carmont
By James L. Norris
Atty.

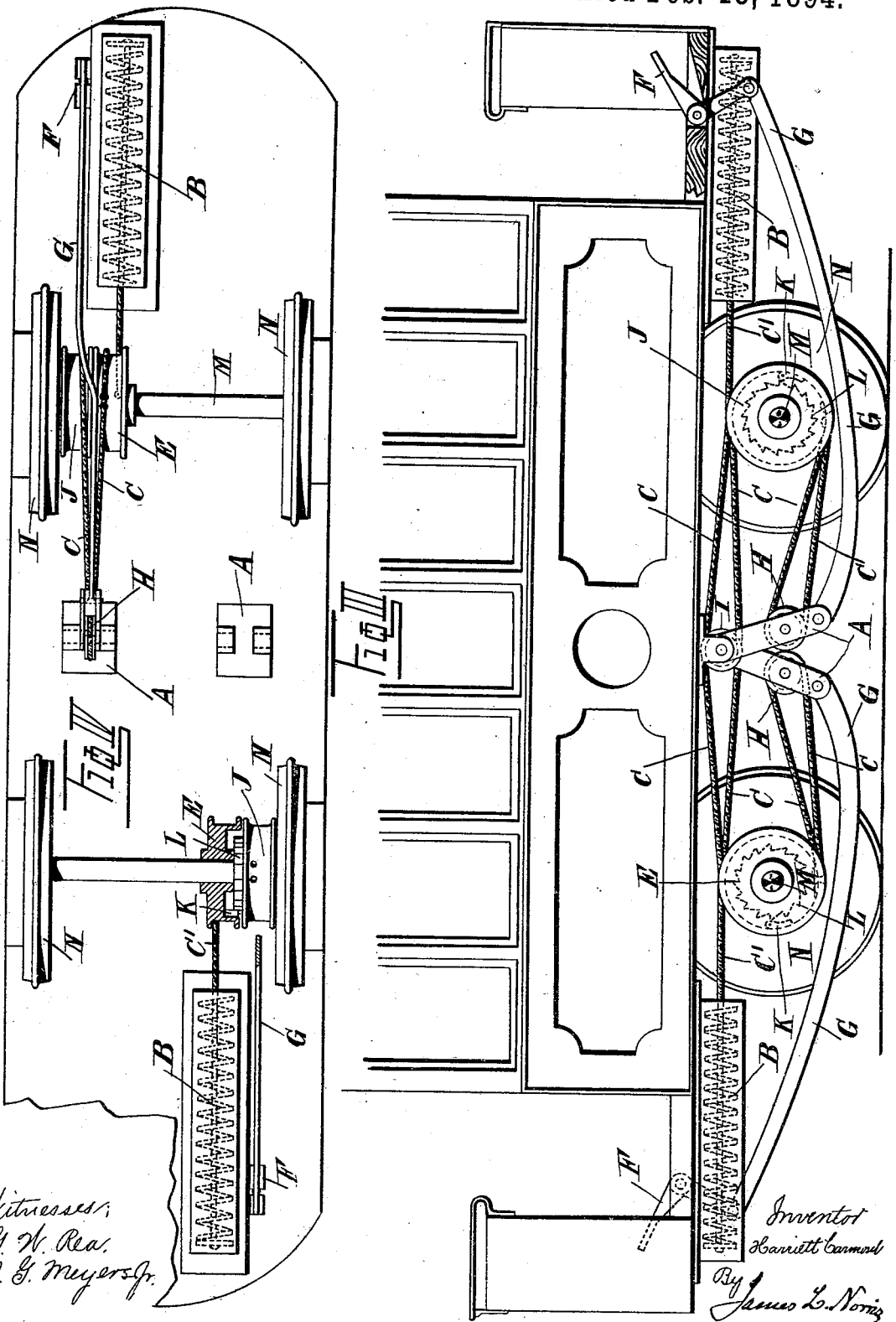

UNITED STATES PATENT OFFICE.

HARRIETT CARMONT, OF LONDON, ENGLAND.

STARTER OR BRAKE FOR VEHICLES.

SPECIFICATION forming part of Letters Patent No. 514,812, dated February 13, 1894.

Application filed June 15, 1893. Serial No. 477,692. (No model.) Patented in England August 24, 1892, No. 15,229.

*To all whom it may concern:*

Be it known that I, HARRIETT CARMONT, a subject of the Queen of Great Britain, and a resident of Helmsdale, Kingston-upon-Thames, London, in the county of Surrey, England, have invented certain new and useful Improved Apparatus for Stopping Omnibuses and other Like Vehicles, (patented in Great Britain, No. 15,229, dated August 24, 1892,) of which the following is a specification.

This invention relates to improved apparatus for stopping omnibuses and other like vehicles.

The annexed drawings show my invention. Figure 1, is a side elevation of part of an omnibus with my brake gear; Fig. 2, a sectional plan of a wheel. Fig. 2ª is an inside face view of the wheel showing the ratchet and loose dropping pawl. Fig. 3, is a part elevation of a tram car with my brake gear in duplicate for operation from either end. Fig. 4, is an under plan of the car with one gear in section to show the portion of internal ratchet wheel.

To carry my invention into practice I hang a frame A from the body of a vehicle and also a spring B. The opposite end of this spring is connected by ropes or straps C to a drum E which can be caused to rotate for putting tension on the spring B when a "spud" F is depressed by the foot of an attendant. The lower end of the spud F either direct or through an intervening lever G has a pulley or "jockey" H and the rope or strap on which it acts is led around or partly around other pulleys I, J, to one of them having a ratchet pawl K pivoted to the internal periphery of the drum E for dropping into the teeth of a ratchet wheel L affixed to the hub M of the bus wheel N and so effecting the pull upon the spring. The spring thus compressed by the winding action of the straps or ropes C around the drum E and pulley J serves to gradually bring the vehicle to a standstill. The pulleys J, E are fast and loose respectively *i. e.* the pulley J is fixed to the hub or axle of the main bearing-wheel N and the pulley E free so that it can rotate in one direction by the pull of the cord C while the pulley J rotates in the opposite direction under the motion of the vehicle, but when the spud F is released the spring B by its rebound pulls the pulley E round and through the ratchet wheel L and pawl K pulls the pulley J and the wheel N in the same direction to move the vehicle forward or to assist the horses in getting their first start with the load.

What I desire to claim and secure by Letters Patent is—

1. In a vehicle-brake, the combination with a spring of a pulley fast upon one of the main bearing wheels, a second pulley loose thereon and having a pawl and ratchet connection with the fixed pulley in one direction of revolution, a pulley journaled upon a frame dropped from the body of the vehicle, a jockey journaled upon a vibratory support fulcrumed upon said frame, a cord or strap passing from the compressible end of the spring over the loose pulley, over the pulley upon the drop-frame, then over the fixed pulley to the jockey and back to the periphery of the loose pulley, and means for vibrating the support for the jockey, substantially as described.

2. In a vehicle-brake, the combination with a compressible spring of a pulley fast upon one of the main bearing wheels of the vehicle, a second pulley loose thereon and having a pawl and ratchet connection with the fixed pulley in one direction of rotation, a pulley I upon a frame dropped from the body of the vehicle, a jockey H journaled upon a vibratory support, a cord or strap passing from the compressible end of the spring over the loose pulley, the pulley I, the fixed pulley, and the pulley H and having its end fast upon the periphery of the fixed pulley, a lever connected to said vibratory support and a spud adapted to operate said lever, substantially as described.

In witness whereof I, HARRIETT CARMONT, have hereunto signed my name, in the presence of two subscribing witnesses, this 29th day of May, 1893.

HARRIETT CARMONT.

Witnesses:
T. S. RIDGWAY,
*St. Michael's Alley, Cornhill, London.*
ALEX. RIDGWAY,
*9 St. Michael's Alley, Cornhill, E. C., Notary Public.*